US012732714B2

(12) United States Patent
García Capel et al.

(10) Patent No.: US 12,732,714 B2
(45) Date of Patent: Sep. 8, 2026

(54) PERFORMANCE-DRIVEN AUTOMATIC EVENT SENSOR CONTROL

(71) Applicant: Omnivision Technologies, Inc., Santa Clara, CA (US)

(72) Inventors: Luis Eduardo García Capel, Singapore (SG); Bo Mu, San Jose, CA (US); Kamal Rana, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 33 days.

(21) Appl. No.: 19/037,425

(22) Filed: Jan. 27, 2025

(65) Prior Publication Data

US 2026/0222700 A1 Jul. 30, 2026

(51) Int. Cl.

| | |
|---|---|
| ***H04N 25/47*** | (2023.01) |
| ***G06T 1/00*** | (2006.01) |
| ***G06T 5/70*** | (2024.01) |
| ***G06T 5/73*** | (2024.01) |

(Continued)

(52) U.S. Cl.

CPC ........... *H04N 25/47* (2023.01); *G06T 1/0007* (2013.01); *G06T 5/70* (2024.01); *G06T 5/73* (2024.01); *H04N 23/81* (2023.01); *H04N 25/707* (2023.01)

(58) Field of Classification Search

CPC ........ H04N 23/81; H04N 25/47; H04N 25/60; H04N 25/707; G06T 1/0007; G06T 5/70; G06T 5/73

See application file for complete search history.

(56) References Cited

U.S. PATENT DOCUMENTS

| | | | | |
|---|---|---|---|---|
| 2020/0137287 A1* | 4/2020 | Krishnappa | .......... | H04N 25/531 |
| 2025/0211867 A1* | 6/2025 | Zannoni | ................. | H04N 25/47 |
| 2025/0218063 A1* | 7/2025 | García Capel | .......... | G06T 11/10 |

OTHER PUBLICATIONS

"L. Pan, C. Scheerlinck, X. Yu, R. Hartley, M. Liu, and Y. Dai, "Bringing a blurry frame alive at high frame-rate with an event camera," in 2019 IEEE/CVF Conference on Computer Vision and Pattern Recognition (CVPR), Jun. 2019, pp. 6813-6822.".

* cited by examiner

*Primary Examiner* — Daniel M Pasiewicz
(74) *Attorney, Agent, or Firm* — MUNCY, GEISSLER, OLDS & LOWE, P.C.

(57) ABSTRACT

The present disclosure relates to an image system with performance-driven automatic event sensor control. The image system comprises a hybrid image sensor and control circuitry. The hybrid image sensor comprises an event driven sensing array and a pixel array. The event driven sensing array includes a plurality of event vision sensor (EVS) pixels arranged in EVS pixel rows. Each EVS pixel of the plurality of EVS pixels is configured to capture EVS data corresponding to contrast information of light incident on that EVS pixel. The pixel array includes a plurality of CMOS image sensor (CIS) pixels arranged in CIS pixel rows. Each CIS pixel of the plurality of CIS pixels is configured to capture CIS data corresponding to intensity of light incident on the CIS pixel. The control circuitry is configured to perform operations comprising: generating metrics based on the EVS data and the CIS data, loading metric weights for each metric from registers, building a cost function by combining the metric weights with the metrics, and optimizing a sensor setting of the event driven sensing array by repeatedly changing the sensor setting to obtain a specific value of the sensor setting that maximizes or minimizes the cost function.

20 Claims, 12 Drawing Sheets

(51) Int. Cl.
*H04N 23/81* (2023.01)
*H04N 25/707* (2023.01)

PERFORMANCE-DRIVEN AUTOMATIC EVENT SENSOR CONTROL

BACKGROUND OF THE INVENTION

1. Field of the Invention

The present disclosure relates to an imaging system, and more particularly, to an image system with performance-driven automatic event sensor control.

2. Description of the Related Art

Imaging system with event vision sensors and/or CMOS image sensors is becoming increasingly significant in modern technological applications. As these imaging systems are deployed across various scenarios, maintaining consistent image quality, such as sharpness and noise performance, presents a formidable challenge. The combination of event-driven and traditional frame-based imaging allows for enhanced temporal resolution and improved dynamic range, yet it also necessitates sophisticated algorithms to effectively manage the diverse data outputs. Ensuring that the image quality remains high across different lighting conditions and motion scenarios requires ongoing research and development. This is particularly critical in applications such as autonomous vehicles, robotics, and advanced surveillance systems, where real-time processing and accurate visual representation are paramount. As the demand for high-performance imaging solutions continues to grow, addressing these challenges will be essential for the successful integration of hybrid image sensors into next-generation technologies.

SUMMARY OF THE INVENTION

One aspect of the present disclosure provides an image system. The image system comprises a hybrid image sensor and control circuitry. The hybrid image sensor comprises an event driven sensing array and a pixel array. The event driven sensing array includes a plurality of event vision sensor (EVS) pixels arranged in EVS pixel rows. Each EVS pixel of the plurality of EVS pixels is configured to capture EVS data corresponding to contrast information of light incident on that EVS pixel. The pixel array includes a plurality of CMOS image sensor (CIS) pixels arranged in CIS pixel rows. Each CIS pixel of the plurality of CIS pixels is configured to capture CIS data corresponding to intensity of light incident on the CIS pixel. The control circuitry is configured to perform operations comprising: generating metrics based on the EVS data and the CIS data, loading metric weights for each metric of the metrics from registers, building a cost function by combining the metric weights with the metrics, and optimizing a sensor setting of the event driven sensing array by repeatedly changing the sensor setting to obtain a specific value of the sensor setting that maximizes or minimizes the cost function.

Another aspect of the present disclosure provides a method of operating an imaging system including a hybrid image sensor. The method comprises: generating metrics based on event vision sensor (EVS) data captured using a plurality of EVS pixels and CMOS image sensor (CIS) data captured using a plurality of CIS pixels of the hybrid image sensor; loading metric weights for each metric of the metrics from registers; building a cost function by combining the metric weights with the metrics; and optimizing a sensor setting of the plurality of EVS pixels by repeatedly changing the sensor setting to obtain a specific value of the sensor setting that maximizes or minimizes the cost function.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, dimensions of the various features may be arbitrarily increased or reduced for clarity of discussion.

DETAILED DESCRIPTION OF THE DISCLOSURE

Figure 1:
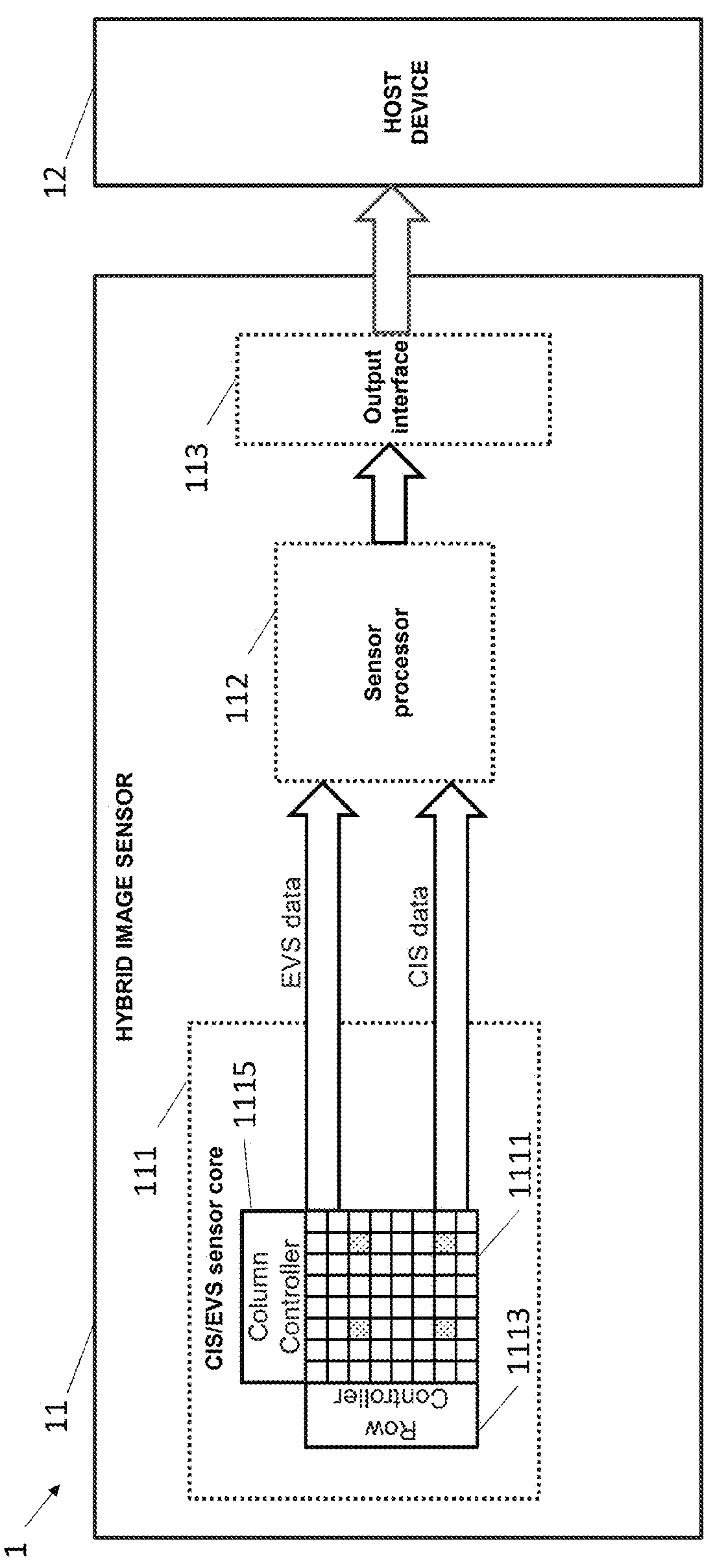
FIG. 1 illustrates a system diagram of an image system, in accordance with some embodiments of the present disclosure.

The present disclosure pertains to hybrid image sensors, as well as the systems, devices, and methods associated therewith. Specifically, several embodiments of the technology described herein are directed to hybrid image sensors comprising active pixels, such as complementary metal-oxide-semiconductor (CMOS) image sensor (CIS) pixels, in conjunction with event vision sensor (EVS) pixels. Additionally, the disclosure addresses methods for operating such hybrid image sensors to accommodate varying resolutions between CIS and EVS. In the ensuing description, specific details are provided to facilitate a comprehensive understanding of the aspects of the present technology. It is acknowledged that those skilled in the relevant field will recognize that the systems, devices, and techniques described herein may be implemented without one or more of the specific details provided, or may employ alternative methods, components, materials, and the like.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from normal deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

A CIS utilizes an array of pixels designed to capture intensity images and video of an external scene. More specifically, these pixels are employed to acquire CIS information (e.g., intensity data) corresponding to light from the external scene that impinges upon the pixels. The CIS information collected during an integration period is subsequently read out at the conclusion of that period and utilized to generate a corresponding intensity image of the external scene.

The pixels within a CIS typically operate under a globally defined integration time. Consequently, the pixels in the array of an active pixel sensor generally share an identical integration time, and each pixel in the array is converted into a digital signal irrespective of its content (e.g., regardless of whether there has been a change in the external scene captured by a pixel since its last readout). As a result, the operation of an active pixel sensor at high frame rates may necessitate a substantial amount of memory and power. Therefore, due in part to constraints related to memory and power, it is challenging to utilize an active pixel sensor independently to capture intensity images and video of an external scene at ultra-high frame rates.

A frame camera equipped with a CIS offers numerous advantages, including synchronous images, spatial dense information, adjustable exposure, image absolute intensity. For a global shutter CIS, synchronous image capture is allowed to ensure that all pixels are exposed simultaneously. This feature eliminates the risk of roller shutter distortion that may occur with sequential image capture. As a result, the frame camera can accurately capture fast-moving objects or scenes with high dynamic ranges. The CIS provides spatial dense information, meaning that it can capture a large number of pixels in a given area. This high pixel density enables the camera to capture fine details and produce high-resolution images. Whether it is for scientific research, surveillance, or professional photography, the frame camera with a CIS can deliver sharp and detailed images.

The CIS may further incorporate a feature of adjustable exposure time. This feature allows the camera to adapt to different lighting conditions and capture images with optimal brightness and contrast. By adjusting the exposure settings, users can ensure that their images are properly exposed, even in challenging lighting situations. Furthermore, the CIS offers image absolute intensity, which refers to the ability to accurately measure the intensity of light in an image. This feature is particularly useful in scientific applications, where precise measurements are required. With a CIS, the frame camera can provide accurate and reliable intensity measurements, making it suitable for various scientific experiments and research. The CIS is also well-suited for capturing static scenes. It excels in capturing still images with minimal noise and distortion. This makes it ideal for applications such as landscape photography, architectural photography, or any situation where a stable and clear image is desired.

Furthermore, when motion or other alterations occur in an external scene during an integration period, motion artifacts may manifest as blurring in the resulting intensity image of the external scene. This blurring can be particularly pronounced under low light conditions, where longer exposure times are employed. Consequently, CISs, when used in isolation, are not particularly effective at capturing sharp intensity images and video of highly dynamic scenes.

In contrast, EVSs (e.g., event-driven sensors or dynamic vision sensors) utilize EVS pixels that are capable of acquiring non-CIS information (e.g., contrast information, intensity variations, event data) corresponding to light from an external scene incident upon those EVS pixels. EVSs read out an EVS pixel and/or convert the corresponding pixel signal into a digital signal only when the EVS pixel detects a change (e.g., an event) in the external scene. In other words, EVS pixels of an event vision sensor that do not detect a change in the external scene remain unread and/or the pixel signals corresponding to such EVS pixels are not converted into digital signals, thereby conserving power. Consequently, each EVS pixel of an event vision sensor operates independently of the other EVS pixels within the same sensor, and only those EVS pixels that detect a change in the external scene are read out and/or have their corresponding pixel signals converted into digital signals. As a result, unlike CISs with synchronous integration times, event vision sensors are not constrained by limited dynamic ranges and are capable of accurately capturing high-speed motion. Therefore, EVSs are often more robust than CISs under low-light conditions and/or in highly dynamic scenes, as they are not adversely affected by underexposure, overexposure, or motion blur associated with a synchronous shutter. In summary, EVSs facilitate ultra-high frame rates and enable precise capture of high-speed motions.

An event camera with an EVS revolutionizes the way we capture and process visual information. Unlike traditional cameras that capture images at a fixed rate, event cameras operate on a completely different principle, offering several advantages that make them highly desirable in various applications. One of the key advantages of event cameras is their ability to capture asynchronous data. Instead of capturing frames at a fixed rate, event cameras only capture and transmit data when there is a change (change in light intensity) in the scene. This means that they are extremely efficient in terms of data transmission and storage, as they only capture and transmit the relevant information. This asynchronous nature allows event cameras to capture fast-moving objects with high accuracy and minimal motion blur, making them ideal for applications such as robotics, autonomous vehicles, and sports analysis.

Another significant advantage of event cameras is their ability to provide temporally dense information. Traditional cameras capture a series of frames at a fixed rate, which may result in missing important details between frames. In contrast, event cameras capture every single change in the scene, providing a continuous stream of information with microsecond-level temporal resolution. This enables event cameras to capture fast and subtle movements that would be missed by traditional cameras, making them suitable for applications such as object tracking, gesture recognition, and motion analysis. Event cameras also excel in capturing scenes with high dynamic range. Traditional cameras struggle to capture scenes with extreme variations in lighting conditions, often resulting in overexposed or underexposed areas. Event cameras, on the other hand, have a high dynamic range, allowing them to capture details in both bright and dark areas simultaneously. This makes event cameras ideal for applications such as surveillance, outdoor imaging, and HDR imaging. Furthermore, event cameras offer the advantage of low power consumption. Since they only capture and transmit data when there is a change in the scene, event cameras require significantly less power compared to traditional cameras that continuously capture frames. This makes event cameras suitable for battery-powered devices and applications where power efficiency is crucial. In conclusion, event cameras, or EVSs, are a groundbreaking technology that offers several advantages over traditional cameras. Their ability to capture asynchronous images, provide temporally dense information, eliminate image blur, and offer high dynamic range makes them highly desirable in various fields such as robotics, autonomous vehicles, surveillance, and more. With their unique capabilities, event cameras are poised to revolutionize the way we capture and process visual information in the future.

Hybrid image sensors utilize an array of pixels that comprises a combination of (i) CIS pixels, which are employed to capture CIS information corresponding to light from an external scene, and (ii) EVS pixels, which are utilized to obtain non-CIS information pertaining to light from the same external scene. Consequently, such hybrid image sensors are capable of simultaneously capturing (a) intensity images or video of the external scene and (b) events occurring within that scene.

The combination of CISs and EVSs offers several advantages. For example, it enables high-speed video reconstruction. CISs capture frames at a fixed rate. However, EVSs only capture changes in the scene, resulting in a sparse representation of the visual information. By combining the two, it is possible to reconstruct high-speed videos by filling in the gaps between the CIS frames with EVS data. This allows for the capture of fast-moving objects and actions that would otherwise be missed by traditional CISs alone.

Another advantage is motion blur reduction. CIS frames may suffer from motion blur when capturing fast-moving objects within an integration time interval of each image frame where the position of fast-moving object vary between the start and end of the integration time. On the other hand, EVSs capture events with high temporal resolution, resulting in less motion blur. By combining the two sensors, it is possible to reduce motion blur in the final image or video, resulting in sharper and more detailed visuals.

Furthermore, the combination of CIS and EVS data may allow for high dynamic range (HDR) imaging with no ghosting. High Dynamic Range (HDR) imaging involves capturing multiple exposures of a scene to capture both the bright and dark areas accurately. However, traditional HDR techniques can result in ghosting artifacts when objects move between exposures. EVSs, with their high temporal resolution, can capture events without any motion blur, allowing for frame deblurring and temporal alignment that will result in accurate HDR imaging without ghosting artifacts.

Methods for combining CISs and EVSs are compatible with applications with multiple cameras or applications with hybrid systems. For example, data of an EVS camera can be combined with data of a CIS camera to output combined image data. Additionally, CIS pixels and EVS pixels can be integrated on the same sensor (e.g., on a single chip) so as to form a hybrid image sensor. The CIS pixels and EVS pixels can be arranged in different patterns for the hybrid image sensor according to the requirements for intensities and events. The ratio of the CIS pixels and EVS pixels on the hybrid image sensor can also vary according to the requirements for intensities and events.

Hybrid image sensors, combining EVS pixels and CIS pixels, offer a range of advantages that make them highly desirable in the field of computer vision. Their ability to capture spatially and temporally dense images, eliminate motion blur, and provide high dynamic range imaging without ghosting make them ideal for a wide range of applications, including robotics, autonomous vehicles, and sports analysis. Hybrid image sensors can also provide easier object recognition and tracking.

FIG. 1 illustrates a system diagram of an image system, in accordance with some embodiments of the present disclosure.

In some embodiments of the present disclosure, an image system 1 is shown in FIG. 1. In some embodiments of the present disclosure, the image system 1 includes a hybrid image sensor 11 and a host device 12. In some embodiments of the present disclosure, the hybrid image sensor 11 includes a CIS/EVS sensor core 111, a sensor processor 112 and an output interface 113. In some embodiments of the present disclosure, the CIS/EVS sensor core 111 includes an image array 1111, a row controller 1113 and a column controller 1115. In some embodiments of the present disclosure, the row controller 1113 and the column controller 1115 control the rows and columns of the pixels in the image array 1111, respectively. In some embodiments of the present disclosure, the EVS data and the CIS data outputted from the image array 1111 are transmitted to the sensor processor 112. In some embodiments of the present disclosure, the processed results can be transmitted to the output interface 113 so as to be further transmitted to the host device 12.

In some embodiments of the present disclosure, the CIS/EVS sensor core 111 in FIG. 1 can be replaced with an EVS sensor core and a CIS sensor core including their own image array. In some embodiments of the present disclosure, the CIS/EVS sensor core 111 in FIG. 1 can be replaced with an EVS sensor core, in which case there is no CIS data in the image system 1. In some embodiments of the present disclosure, the CIS/EVS sensor core 111 in FIG. 1 can be replaced with a CIS sensor core, in which case there is no EVS data in the image system 1.

Figure 2:
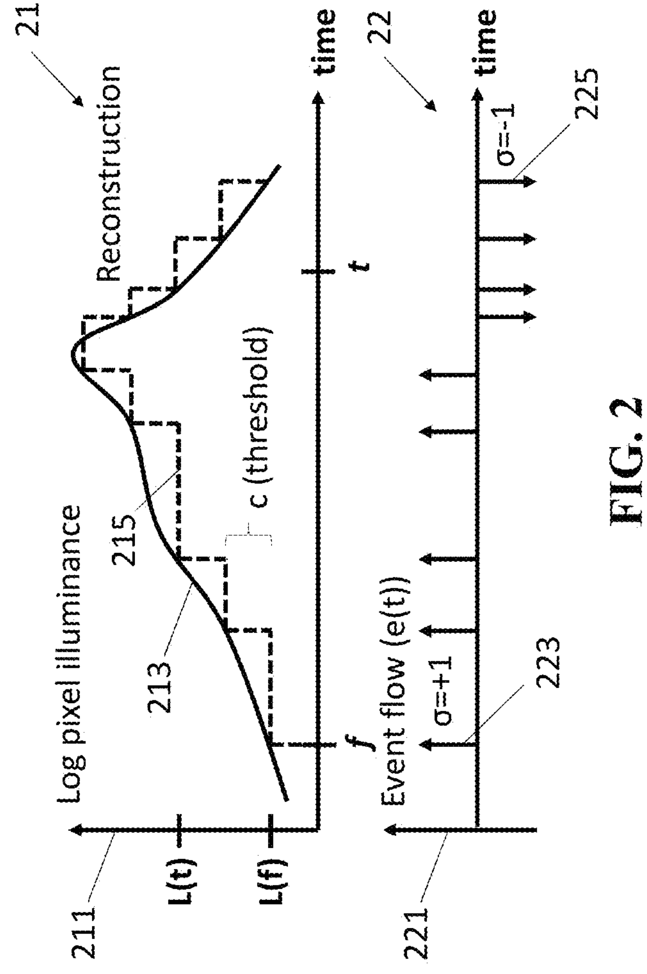
FIG. 2 illustrates time diagrams of the log pixel illuminance and the event flow, in accordance with some embodiments of the present disclosure.

FIG. 2 illustrates time diagrams of the log pixel illuminance and the event flow, in accordance with some embodiments of the present disclosure.

FIG. 2 shows an EVS-to-CIS space conversion illustrating how events from event pixels are used to derive the temporal value of a CIS pixel location. In some embodiments of the present disclosure, the events are accumulated through event time integral shown as follows:

$$E_{p_i}(t) = f(E_C(t)) \tag{1}$$

wherein $p_i \in P$, $c_i \in C$.

P is a set of CIS channels, and C is a set of EVS channels. In some embodiments of the present disclosure, when there are four CIS channels and four EVS channels.

$$P = \{p_1, p_2, p_3, p_4\} \tag{2}$$

$$C = \{c_1, c_2, c_3, c_4\} \tag{3}$$

Accordingly, an arbitrary combination of the four EVS channels to obtain a given CIS channel can be represented as follows:

$$E_{p_i}(t) = f(E_C(t)) = f\left(E_{c_1}(t), E_{c_2}(t), E_{c_3}(t), E_{c_4}(t)\right) \tag{4}$$

That is, the event integral for any CIS channel $p_i$ is a function of the event integrals of the EVS channels $c_i$.

The function of the event time integral can be shown as follows:

$$E(t) = \int_f^t e(s)ds \tag{5}$$

wherein $f$ is a reference time, t represents the endpoint time for event accumulation.

L($f$) is the logarithm of the pixel illuminance of the given CIS channel as reference. The logarithm of the temporally aligned image L(t) can be calculated as follows:

$$L(t) = L(f)\exp(cE(t)) \tag{6}$$

wherein c is an event detection contrast threshold value, which determines the luminance change that triggers an event.

Accordingly, the CIS data at the reference time $f$ and the event integral between time $f$ and time t are combined to obtain a temporal estimation for a given event pixel at the time t.

FIG. 2 includes two time diagrams 21 and 22. As shown in FIG. 2, the vertical axis 211 of time diagram 21 is the logarithm of the pixel illuminance, and the vertical axis 221 of the time diagram 22 is the event flow e (t). Each of the impulses in time diagram 22 means a detected event of one of the event pixels. The detected events include positive events and negative events corresponding to the change in intensity. For example, impulse 223 is a positive event (e.g., increase in light intensity) and impulse 225 is a negative event (e.g., decrease in light intensity).

Curve 213 in time diagram 21 is the actual pixel illuminance received by the given CIS channel. Curve 215 in time diagram 21 is the reconstructed pixel illuminance of the given CIS channel. As shown in time diagram 21, curve 215 corresponds to the integral of the impulses in time diagram 22. At the time of each positive impulse, curve 215 steps up a positive detection contrast threshold value c, and, at the time of each negative impulse, curve 215 steps down a negative detection contrast threshold value c. As shown in time diagram 21, curve 215 can fit curve 213 so that the reconstructed pixel illuminance can be deemed as corresponding to the actual pixel illuminance received by the given CIS channel.

In some embodiments of the present disclosure, such process can be applied to correct one or multiple channels in an image sensor. In some embodiments of the present disclosure, such process can be applied to correct all channels in an image sensor. In some embodiments of the present disclosure, such process can be applied to correct all pixel locations in an image sensor. In some embodiments of the present disclosure, such process can be applied to a specific (e.g., a region of interest) in an image sensor, which may be enabled by activity monitoring, object recognition or feature recognition, etc.

Event rate relates to the number of events per time interval. For a low-contrast scene, the luminance change due to motion is generally low so that the luminance change may seldom reach the event detection contrast threshold value c. Accordingly, the event rate of the low-contrast scene would be relatively low. To the contrary, for a high-contrast scene, the luminance change due to motion is generally high so that the luminance change may reach the event detection contrast threshold value c more often. Accordingly, the event rate of the high-contrast scene would be relatively high.

In some embodiments of the present disclosure, the event detection contrast threshold value c could be adjusted to maintain a steady event rate. For example, for the low-contrast scene, the event detection contrast threshold value c should be lower so that the luminance change due to motion could trigger an event more often (i.e., event rate becomes higher than the case of constant threshold value). To the contrary, for the high-contrast scene, the event detection contrast threshold value c should be higher so that the luminance change due to motion could trigger an event less often (i.e., event rate becomes lower than the case of constant threshold value).

Figure 3:
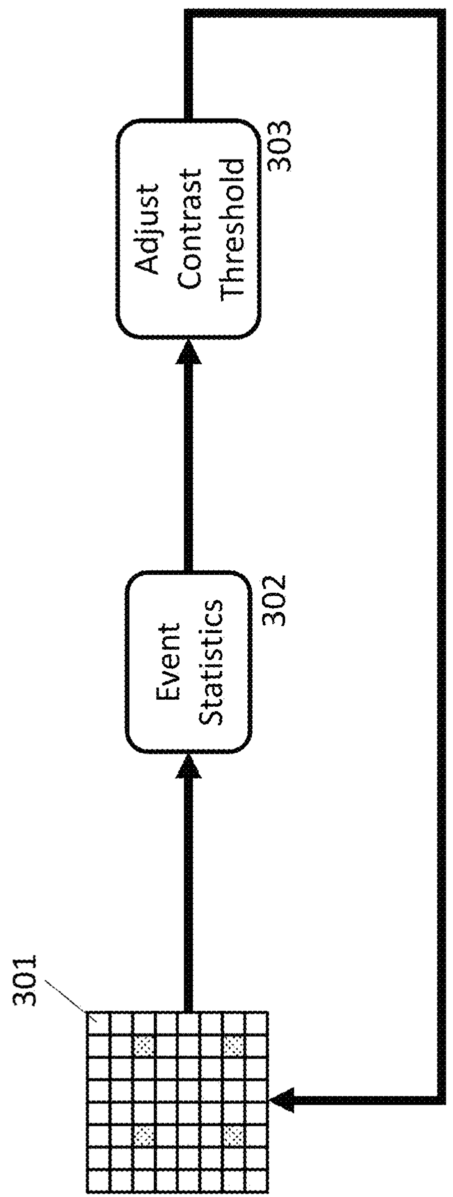
FIG. 3 illustrates the operation of automatic threshold control, in accordance with some embodiments of the present disclosure.

FIG. 3 illustrates the operation of automatic threshold control, in accordance with some embodiments of the present disclosure.

As shown in FIG. 3, the events triggered by a hybrid image sensor 301 should be evaluated by an event statistics block 302. The evaluation results of the event statistics block 302 are sent to an adjust contrast threshold block 303 for determining how the event detection contrast threshold value c of the hybrid image sensor 301 should be adjusted. The adjust contrast threshold block 303 then sends a feedback signal to the hybrid image sensor 301 so as to adjust the event detection contrast threshold value c.

Figure 4:
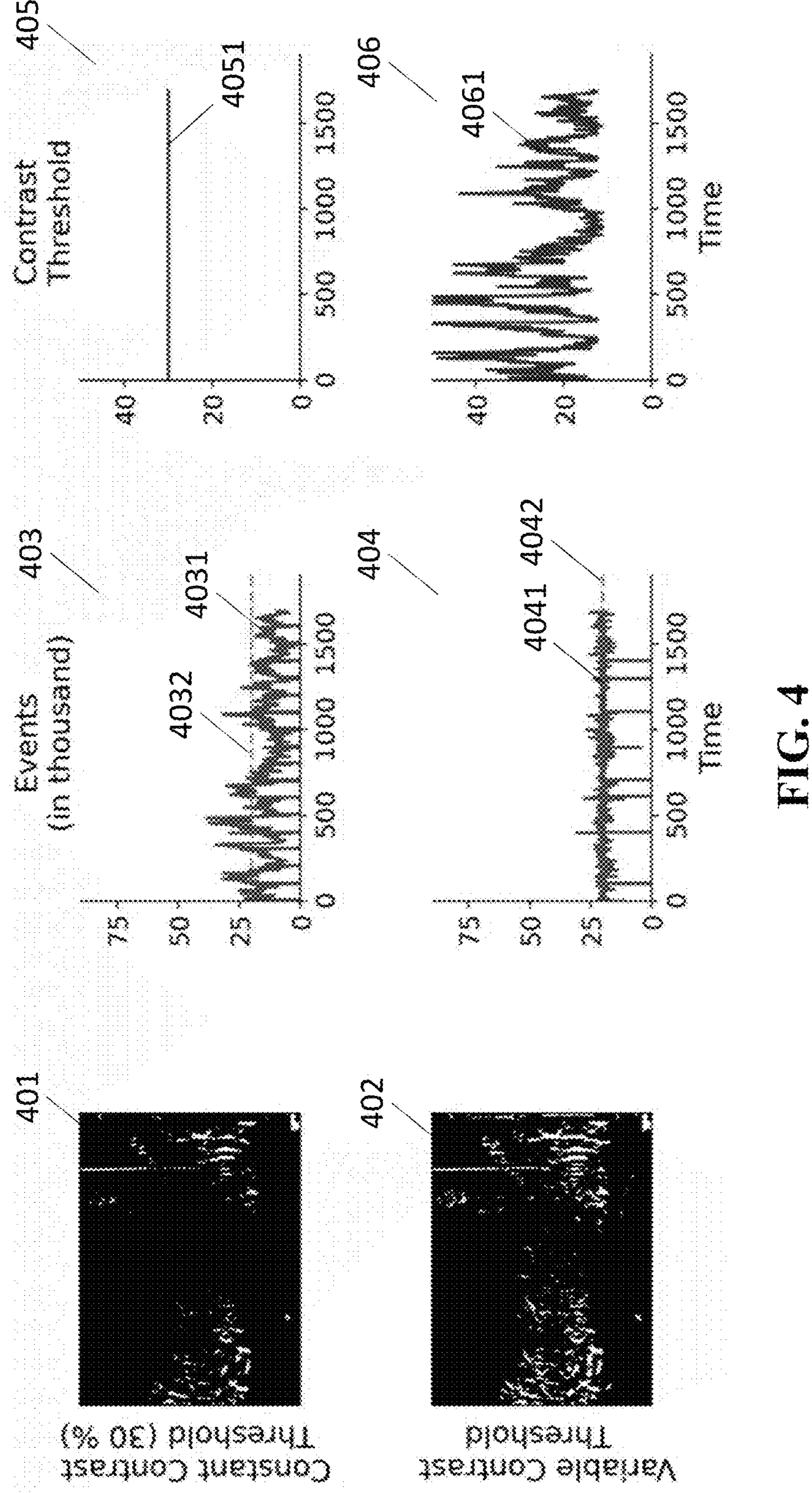
FIG. 4 illustrates a comparison between constant contrast threshold and variable contrast threshold, in accordance with some embodiments of the present disclosure.

FIG. 4 illustrates a comparison between constant contrast threshold and variable contrast threshold, in accordance with some embodiments of the present disclosure.

Image 401 shows an event map of a scene with a constant contrast threshold. Line graph 403 includes a line 4031 showing the event counts (in thousand) over time. A dot line 4032 in line graph 403 shows an event count of 20. As shown in line graph 403, line 4031 varies over time. Line graph 405 includes a line 4051 showing the contrast threshold over time. As shown in line graph 405, line 4051 remains a constant of 30%. The definition of the contrast represents a ratio between the luminance difference and the average luminance.

Image 402 shows an event map of a scene with variable contrast thresholds. Line graph 404 includes a line 4041 showing the event counts (in thousand) over time. A dot line 4042 in line graph 404 shows an event count of 20. As shown in line graph 404, line 4041 generally remain constant over time. Line graph 406 includes a line 4061 showing the contrast threshold over time. As shown in line graph 406, line 4061 varies over time so as to keep the event rate a constant.

The sensor with automatic threshold control is designed to dynamically adapt to various environmental conditions, ensuring optimal performance across diverse scenarios. It adjusts to the amount of motion in the scene, taking into account the size of moving objects, as well as their speed. This adaptability allows for enhanced detection capabilities, particularly in low-contrast areas where traditional sensors may struggle.

Moreover, the sensor effectively mitigates the risk of event data drop, especially when operating at maximum event rates. This feature is crucial for maintaining data integrity and ensuring that critical events are captured without interruption.

In addition, the sensor strikes an ideal balance between performance and power consumption. By optimizing the trade-off between output data and energy usage, it ensures that high-quality detection does not come at the expense of excessive power draw. This makes the sensor not only efficient but also suitable for long-term deployment in various applications. Overall, its advanced capabilities make it a reliable choice for professionals seeking robust and efficient motion detection solutions.

However, automatic threshold control presents several challenges that can hinder its effectiveness across varying scenarios. One significant issue arises from the reliance on a fixed target event rate, which does not universally apply. In static scenes with no motion, low contrast thresholds can inadvertently amplify noise, leading to inaccurate event detection. Additionally, scenes characterized by varying contrast levels can significantly influence the event rate, complicating the threshold adjustment process. Illumination variations further exacerbate this challenge. Darker environments necessitate lower contrast threshold values to detect motion, while brighter settings may require higher thresholds. Moreover, when maintaining a consistent target event rate, larger moving objects tend to exhibit lower event density, which can skew the overall detection accuracy. These factors underscore the necessity for a more adaptive approach to threshold control, one that can dynamically respond to the specific conditions of each scene to optimize event detection and minimize noise interference.

Implementing variable target event rates presents several challenges that require careful consideration. Firstly, reliance on predefined look-up tables based on illumination parameters, such as auto exposure values, may not accurately reflect the unique characteristics of different scenes. This limitation can lead to suboptimal performance in dynamic environments. Secondly, distinguishing between noise and meaningful events remains a critical issue. Lastly, calculating motion speed can be computationally intensive, potentially straining system resources and impacting overall efficiency. Addressing these challenges is crucial for enhancing the robustness and effectiveness of event-driven systems in real-world applications.

Since event rate does not directly correlate with performance outcomes, it prompts the exploration of alternative methodologies to enhance sensor control mechanisms. One promising approach is to replace the conventional target event rate with a more objective metric that prioritizes improvements in image quality (IQ) or overall system performance.

Image quality is inherently application-dependent, necessitating tailored sensor settings to achieve optimal results. For instance, in applications such as image deblurring or slow-motion video reconstruction, it is crucial to configure sensor parameters that maximize frame quality. This includes optimizing for sharp edges and minimizing noise, thereby ensuring that the resultant images meet the highest standards of clarity and detail.

Moreover, automatic sensor control can significantly benefit computer vision tasks. For object detection, sensor settings should be fine-tuned to enhance both precision and recall, ensuring that the system accurately identifies and classifies objects within the visual field. Similarly, in tracking applications, it is essential to adjust sensor parameters to maximize tracking accuracy, thereby improving the reliability of the system in dynamic environments.

By shifting the focus from event rate to these more relevant metrics, we can drive advancements in sensor control that not only enhance image quality but also elevate the performance of various applications in computer vision and beyond. This strategic approach holds the potential to redefine standards in sensor technology, paving the way for more effective and efficient systems.

Figure 5:
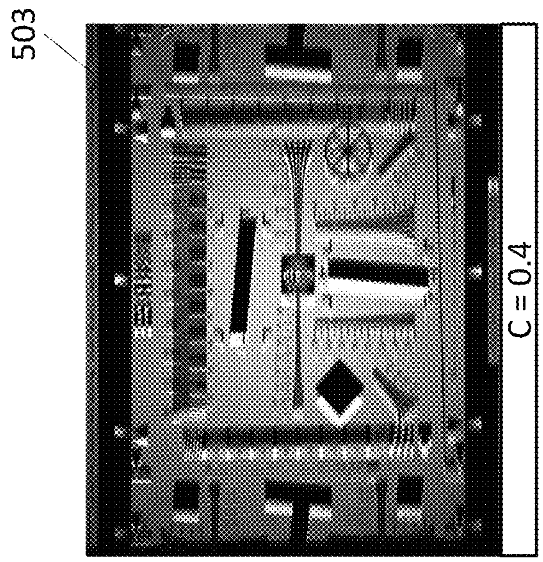
FIG. 5 illustrates impacts of different contrast thresholds on image deblurring performance, in accordance with some embodiments of the present disclosure.
Figure 5:
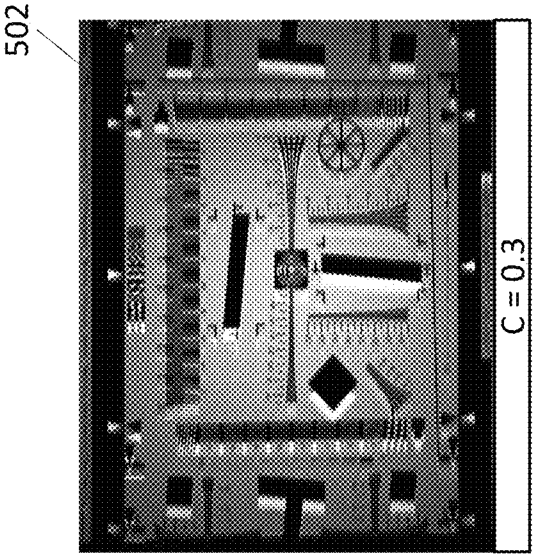
Figure 5:
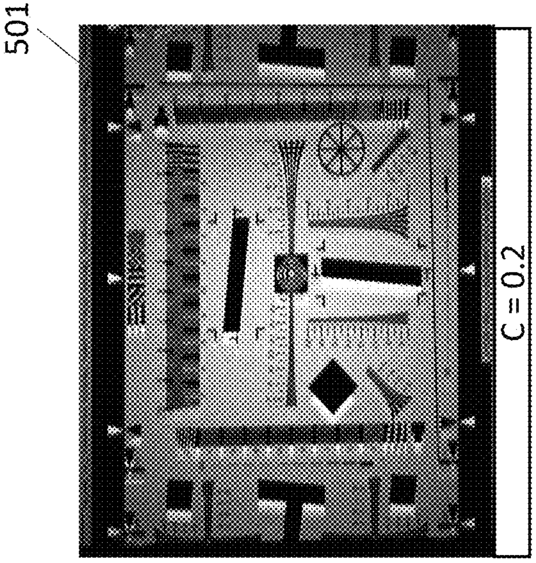

FIG. 5 illustrates the impact of different contrast thresholds on image deblurring performance, in accordance with some embodiments of the present disclosure.

Images 501, 502 and 503 show images with different contrast thresholds. The contrast threshold of image 501 is 0.2. The objects of image 501 present sharp edges. However, as shown in the blank space of image 501, image 501 has poor signal-to-noise ratio (SNR). The contrast threshold of image 503 is 0.4. The objects of image 503 present blurry edges. However, as shown in the blank space of image 503, image 503 has better SNR. The contrast threshold of image 502 is 0.3. Image 502 shows a compromise between sharpness and SNR.

Figure 6A:
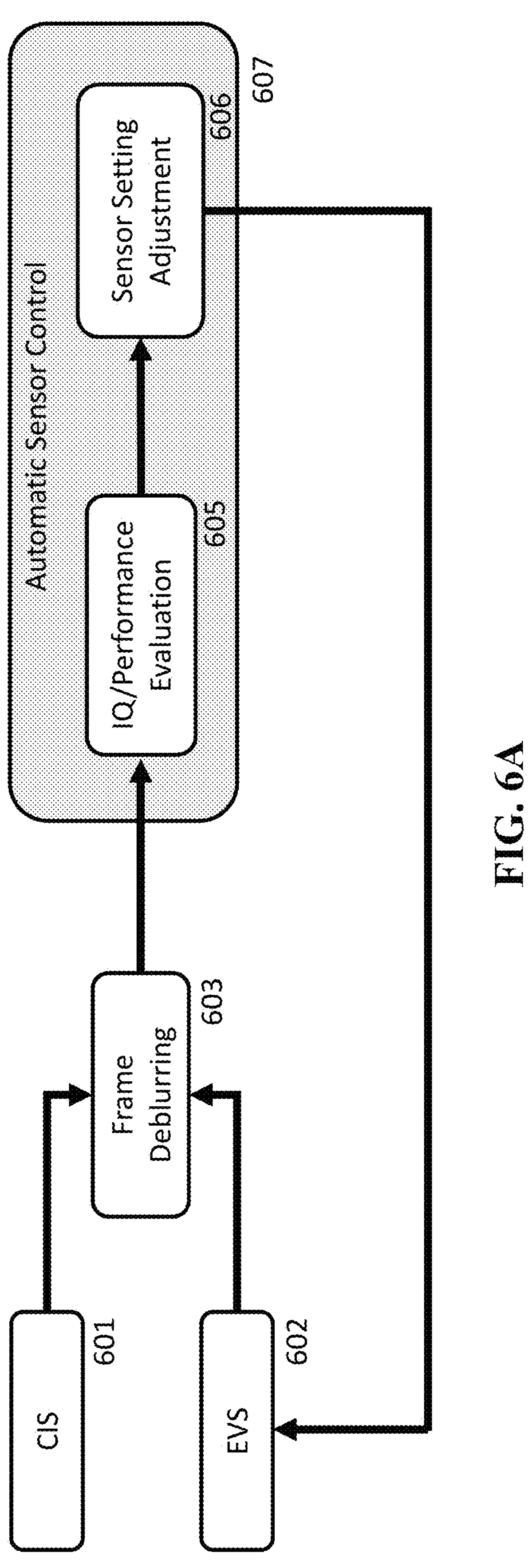
FIG. 6A illustrates an image deblurring process, in accordance with some embodiments of the present disclosure.

FIG. 6A illustrates an image deblurring process, in accordance with some embodiments of the present disclosure.

In reference to FIG. 3, FIG. 6A shows that the data from the CIS 601 of the hybrid image sensor 301 and the data from the EVS 602 of the hybrid image sensor 301 are combined for frame deblurring 603. Then, an image quality (IQ)/performance evaluation 605 is performed on the deblurred data. The evaluated results are used as reference for sensor setting adjustment 606 for determining how the event detection contrast threshold value c of the EVS 602 should be adjusted. A feedback signal is then sent to the EVS 602 to adjust the event detection contrast threshold value c. Accordingly, the automatic sensor control 607 includes the IQ/performance evaluation 605 and the sensor setting adjustment 606.

Figure 6B:
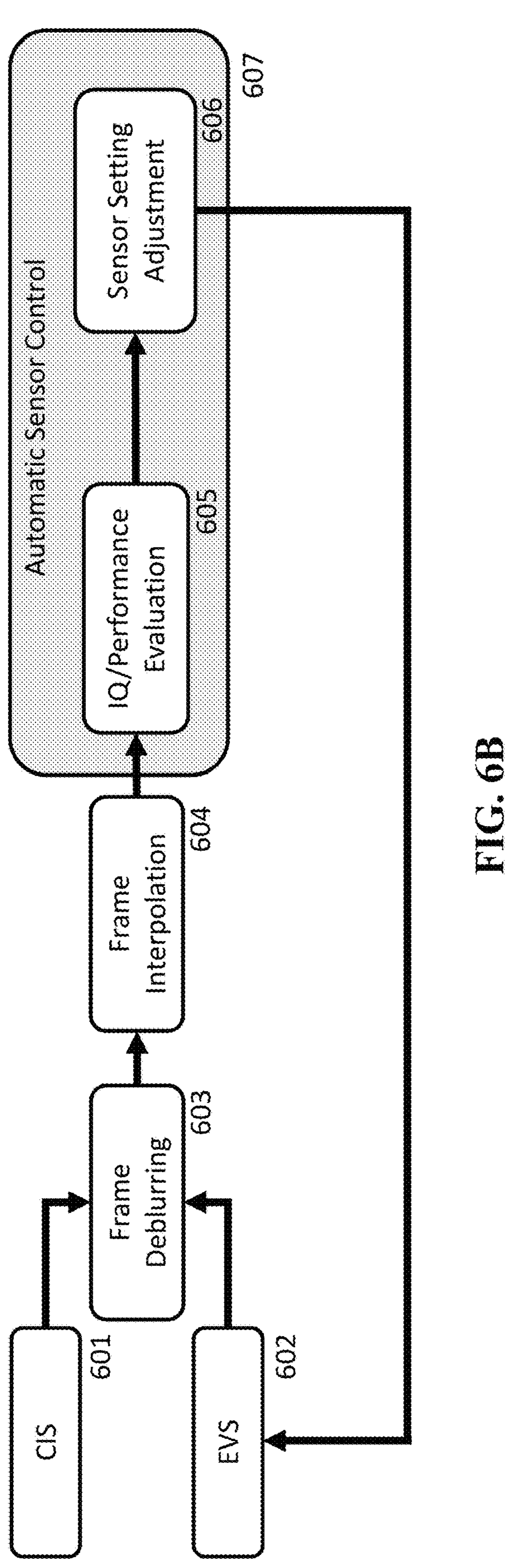
FIG. 6B illustrates a slow-motion video process, in accordance with some embodiments of the present disclosure.

FIG. 6B illustrates a slow-motion video process, in accordance with some embodiments of the present disclosure.

Similar to the image deblurring process in FIG. 6A, FIG. 6B shows that the data from the CIS 601 of the hybrid image sensor and the data from the EVS 602 of the hybrid image sensor are combined for frame deblurring 603 and frame interpolation 604. Then, an image quality (IQ)/performance evaluation 605 is performed on the deblurred data. The evaluated results are used as reference for sensor setting adjustment 606 for determining how the event detection contrast threshold value c of the EVS 602 should be adjusted. A feedback signal is then sent to the EVS 602 to adjust the event detection contrast threshold value c. Accordingly, the automatic sensor control 607 includes the IQ/performance evaluation 605 and the sensor setting adjustment 606.

Figure 7:
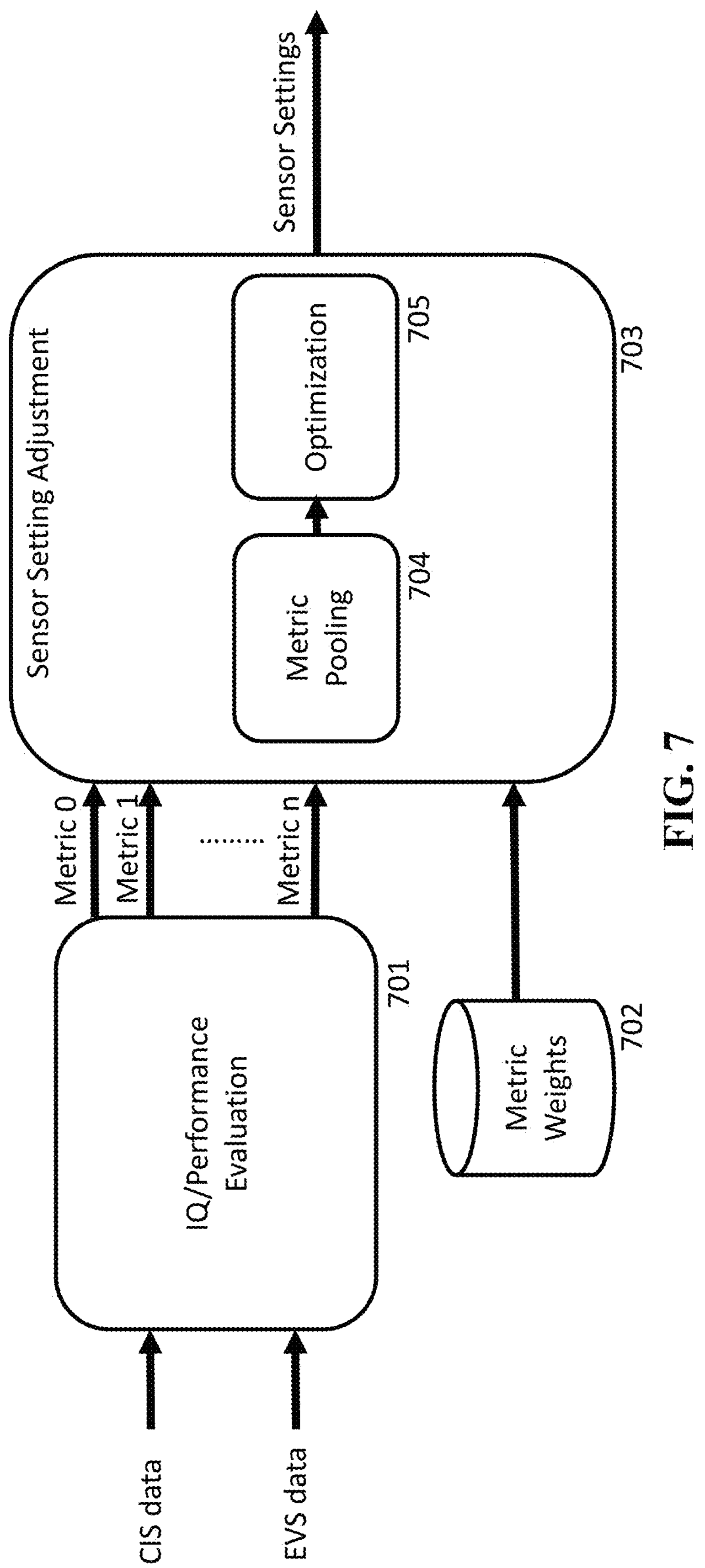
FIG. 7 illustrates the adjustment of sensor settings, in accordance with some embodiments of the present disclosure.

FIG. 7 illustrates the adjustment of sensor settings, in accordance with some embodiments of the present disclosure.

FIG. 7 shows another embodiment to explain the automatic sensor control 607 in FIGS. 6A and 6B. Instead of being combined for frame deblurring first as in FIGS. 6A and 6B, the CIS data and the EVS data are directly sent to the IQ/performance block 701. Multiple metrics (e.g., Metric 0, Metric 1, . . . , Metric n) are extracted from the CIS data and the EVS data. The metrics are sent to the sensor setting adjustment block 703. Metric weights 702 for each of the metrics are stored in a buffer or register. Metric pooling 704 is performed to combine the metric weights with the metrics to build a cost function. Then, optimization 705 is performed to optimize sensor settings for the EVS by repeatedly changing the sensor setting to obtain a specific value of the sensor setting that maximizes or minimizes the cost function.

In some embodiments of the present disclosure, several key metrics are commonly used to evaluate the effectiveness of CIS. One of the primary metrics is the signal-to-noise ratio (SNR), which measures the level of desired signal relative to the background noise. A higher SNR indicates a clearer image with less noise, which is crucial for capturing high-quality images, especially in low-light conditions. SNR is often expressed in decibels (dB) and is a critical factor in determining the overall image quality. Another important metric is the histogram, which provides a graphical representation of the distribution of pixel intensities in an image. By analyzing the histogram, one can assess the exposure and dynamic range of the sensor. A well-distributed histogram indicates a balanced exposure, while a histogram skewed to one side may suggest overexposure or underexposure, impacting the image's detail and quality. Additionally, the gradient metric is significant in evaluating the sensor's ability to capture fine details and transitions in an image. The gradient measures the rate of change in pixel intensity, which is essential for edge detection and overall image sharpness. A sensor with a high gradient capability can reproduce intricate details, making it suitable for applications requiring precision. In addition to the aforementioned metrics used to evaluate the quality of images of CIS, there are numerous other metrics that can also provide valuable insights into sensor performance.

In some embodiments of the present disclosure, several key metrics are commonly used to evaluate the effectiveness of EVS. One key metric is the event noise count, which is derived from the EVS denoising operation. This metric quantifies the number of denoise events that may arise due to sensor noise per time interval, providing insights into the sensor's ability to filter out irrelevant data and maintain signal integrity. A lower event noise count indicates a more reliable sensor performance. Another important metric is local density, which measures the concentration of events within a specific area over a given time frame. High local density can signify active regions in a scene, allowing for better object tracking and scene understanding. This metric is particularly useful in dynamic environments where rapid changes occur, enabling real-time analysis and decision-making. Additionally, the object detection confidence score plays a crucial role in assessing the accuracy of detected objects within the sensor's field of view. This score reflects the likelihood that a detected event corresponds to a real object, aiding in the reduction of false positives and enhancing the overall reliability of the sensor's output. While these metrics are fundamental in evaluating the performance of event vision sensors, other metrics can also be utilized to measure image quality.

In some embodiments of the present disclosure, the metrics are measurements used to evaluate image quality or system performance of the imaging system. In some embodiments of the present disclosure, the metrics include more than one of signal-to-noise ratio (SNR), histogram, gradient, event noise count, local density and object detection confidence score.

In some embodiments of the present disclosure, assessment of image quality often relies on specific metrics that can be influenced by sensor settings. For example, sharpness in event-specified regions is a critical attribute that defines the clarity and detail of an image. In some embodiments of the present disclosure, to quantify sharpness in a designated event-specified region, the following formula may be utilized:

$$H(x,y)=I(x,y)-(I(x,y)\otimes \text{Lowpass}(x,y)),(x,y)\in EVS\ \text{region} \tag{7}$$

Here, I(x, y) represents the intensity of the image at coordinates (x, y), and Lowpass(x, y) denotes a low-pass filter applied to the image at coordinates (x, y). I(x, y) is convolved with Lowpass(x, y). The difference between the original image and a low-pass version of it highlights the edges.

The sharpness metric is then calculated as the sum of H(x, y) over the overlapping EVS region:

$$\text{Sharpness}=\Sigma H(x,y),(x,y)\in EVS\ \text{region} \tag{8}$$

This approach allows for a focused evaluation of sharpness in areas of interest, which is particularly important in applications where detail is paramount.

Noise is an inherent characteristic of digital images, often manifesting as random variations in pixel intensity. To measure noise in regions devoid of significant events (non-event regions), the standard deviation of pixel values is computed:

$$\text{Noise}=std(N(x,y)),(x,y)\notin EVS\ \text{region} \tag{9}$$

This metric provides insight into the level of unwanted variations that can obscure details in the image, thereby affecting overall quality.

The sharpness-to-noise ratio integrates the sharpness and noise measurements to yield a comprehensive image quality (IQ) assessment. The sharpness-to-noise ratio is expressed as:

$$IQ = \text{Sharpness}/\text{Noise} \quad (10)$$

A higher IQ value indicates a clearer image with less noise, making this ratio a valuable tool for comparing the effectiveness of different sensor settings and imaging conditions.

In some embodiments of the present disclosure, one of the metrics is proportional to a sharpness value, wherein the sharpness value is a sum of intensity differences of the overlapping EVS pixels of the plurality of EVS pixels that sense events. In some embodiments of the present disclosure, the one of the metrics is inversely proportional to a noise value, wherein the noise value is a standard deviation of the noise of the overlapping EVS pixels of the plurality of EVS pixels that do not sense events.

In the formulation of a cost function, the integration of metric weights and metrics plays a crucial role in defining the optimization landscape. The cost function can take various forms, such as linear or quadratic, depending on the nature of the metrics involved. For a linear cost function, the cost function is expressed as:

$$\text{cost} = \sum_{x=0}^{n} a_i * \text{metric}_i \quad (11)$$

where $a_i$ represents the weight assigned to each metric ($\text{metric}_i$). This linear combination allows for a straightforward assessment of the contribution of each metric to the overall cost.

On the other hand, a quadratic cost function introduces a non-linear element, enhancing the model's ability to capture more complex relationships between metrics. For a quadratic cost function, the cost function is expressed as:

$$\text{cost} = \sum_{x=0}^{n} a_i * \text{metric}_i + b_i * \text{metric}_i^2 \quad (12)$$

where $a_i$ represents the weights assigned to each metric ($\text{metric}_i$). and $b_i$ represents the weight assigned to the squared terms, allowing for the modeling of interactions and diminishing returns among the metrics. The choice between linear and quadratic cost functions ultimately depends on the specific characteristics of the data and the objectives of the optimization problem at hand.

In some embodiments of the present disclosure, the cost function is a linear function of the metrics and the metric weights. In some embodiments of the present disclosure, the cost function is a quadratic function of the metrics and the metric weights. In some embodiments of the present disclosure, other forms of pooling can be used for the cost function.

The dimensionality of the cost function is critical in optimization problems across various fields, including machine learning and operations research. In a one-dimensional (1D) cost function, the optimization process involves a single variable, allowing for straightforward analysis and visualization of the cost landscape. As we progress to two-dimensional (2D) cost functions, the complexity increases, necessitating the consideration of interactions between two variables, which can lead to more intricate optimization surfaces. In three-dimensional (3D) scenarios, the cost function incorporates three variables, further complicating the optimization landscape and often requiring advanced techniques such as gradient descent or evolutionary algorithms to navigate effectively. Understanding the dimensionality of the cost function is essential for selecting appropriate optimization strategies and ensuring efficient convergence to optimal solutions.

To optimize sensor settings for maximizing or minimizing the cost function, various techniques can be employed, including gradient descent, Adam optimization, and other neural network methodologies. Gradient descent is a fundamental optimization algorithm that iteratively adjusts parameters by calculating the gradient of the cost function, allowing for efficient convergence towards a local minimum. On the other hand, the Adam optimizer enhances this process by incorporating adaptive learning rates and momentum, which can lead to faster convergence and improved performance in complex landscapes. Additionally, leveraging advanced neural network architectures can facilitate the exploration of high-dimensional parameter spaces, enabling the model to learn intricate patterns and relationships within the data. By systematically applying these optimization techniques, one can effectively fine-tune sensor settings to achieve desired image quality metrics. Ultimately, the choice of optimization method should be guided by the specific characteristics of the cost function and the underlying data, ensuring a tailored approach to achieving optimal sensor configurations.

Figure 8:
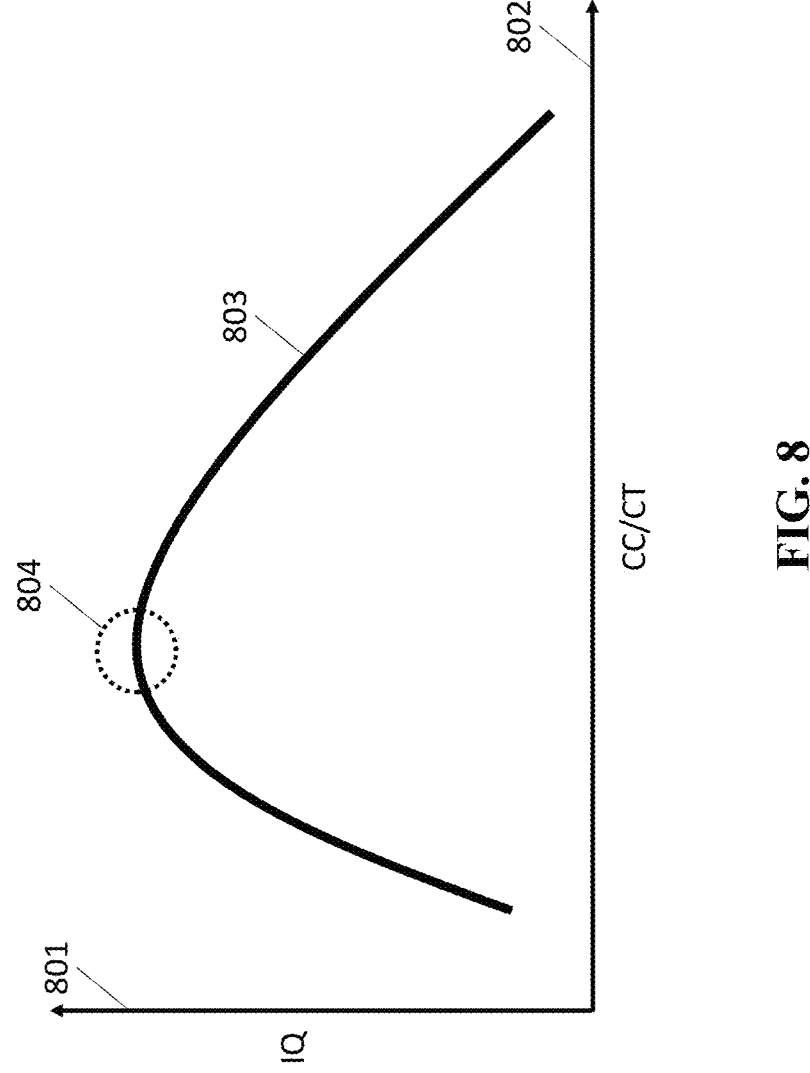
FIG. 8 illustrates the optimization between image quality metrics and sensor settings, in accordance with some embodiments of the present disclosure.

FIG. 8 illustrates the optimization between image quality metrics and sensor settings, in accordance with some embodiments of the present disclosure.

FIG. 8 shows an example of how sensor settings for the EVS are optimized according to the IQ metrics. The vertical axis 801 in FIG. 8 denotes the quantity of an IQ metric, which may be any one of the aforementioned metrics or the cost function including the combination of metrics and metric weights. The horizontal axis 802 in FIG. 8 denotes either the coupling capacitor CC in the EVS or the contrast threshold CT of the EVS. In some embodiments of the present disclosure, when the coupling capacitor CC in the EVS becomes larger, the sensed images will have worse sharpness but have better noise performance. To the contrary, when the coupling capacitor CC in the EVS becomes lesser, the sensed images will have better sharpness but have worse noise performance. In some embodiments of the present disclosure, when the contrast threshold CT of the EVS becomes larger, the sensed images will have worse sharpness but have better noise performance. To the contrary, when the contrast threshold CT of the EVS becomes lesser, the sensed images will have better sharpness but have worse noise performance. As shown in FIG. 8, line 803 shows the dependence between the IQ metric and the CC/CT value, and the optimal CC/CT value can be found at the maximum IQ metric 804 by sweeping the CC/CT value.

To optimize sensor performance, several key settings can be adjusted, including contrast threshold, capacitance, and resolution. Modifying the contrast threshold enhances the sensor's ability to differentiate between varying light levels, thereby improving image clarity. Adjusting capacitance can influence the sensor's sensitivity and response time, allowing for more accurate data capture. Additionally, fine-tuning the resolution such as applying binning can be crucial for achieving the desired level of detail without sacrificing too much pixel sensitivity in the output images. These adjustments ensure that the sensor operates at its maximum efficiency, providing reliable and precise measurements for various applications.

In some embodiments of the present disclosure, optimizing the sensor setting comprises maximizing or minimizing the cost function with one of the optimizers in machine learning. In some embodiments of the present disclosure, the sensor setting is a contrast threshold of the plurality of EVS pixels.

Figure 9:
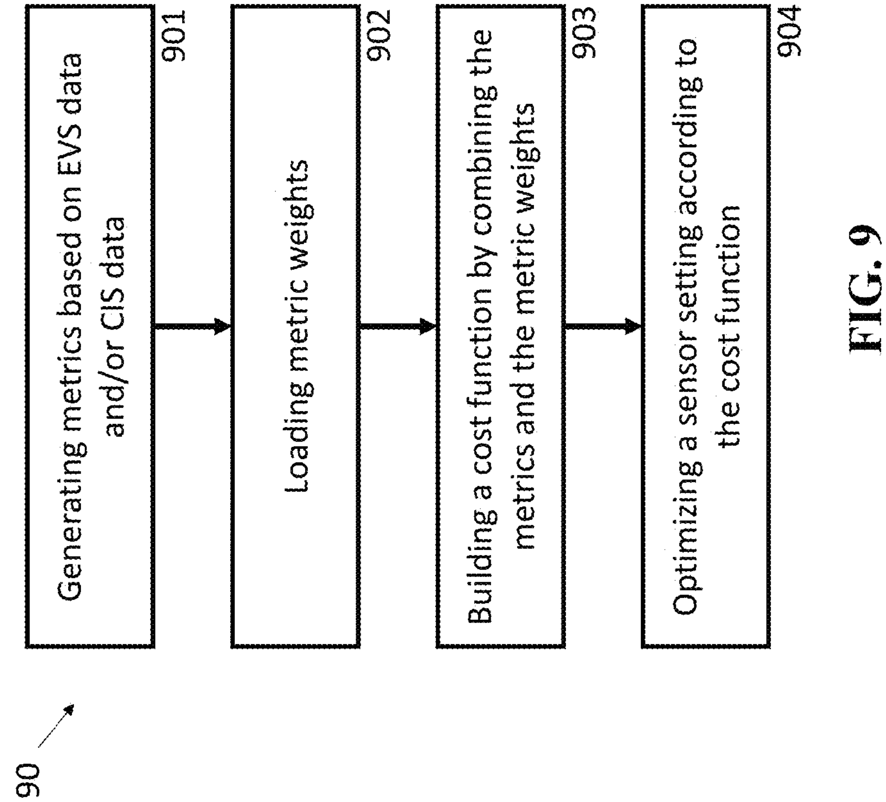
FIG. 9 illustrates of operating an imaging system including a hybrid image sensor, in accordance with some embodiments of the present disclosure.

FIG. 9 illustrates a method 90 of operating an imaging system including a hybrid image sensor, in accordance with some embodiments of the present disclosure.

The method starts from step 901. In some embodiments of the present disclosure, the method 90 comprises steps 901-904. In step 901, metrics are generated based on the EVS data captured using a plurality of EVS pixels and/or the CIS data captured using a plurality of CIS pixels of the hybrid image sensor. In step 902, metric weights are loaded for each metric of the metrics from registers. In step 903, a cost function is built by combining the metric weights with the metrics. In step 904, a sensor setting of the plurality of EVS pixels is optimized by repeatedly changing the sensor setting to obtain a specific value of the sensor setting that maximizes or minimizes the cost function.

In some embodiments of the present disclosure, optimizing the sensor setting comprises maximizing or minimizing the cost function with one of the optimizers in machine learning. In some embodiments of the present disclosure, the sensor setting is a contrast threshold of the plurality of EVS pixels.

Figure 10A:
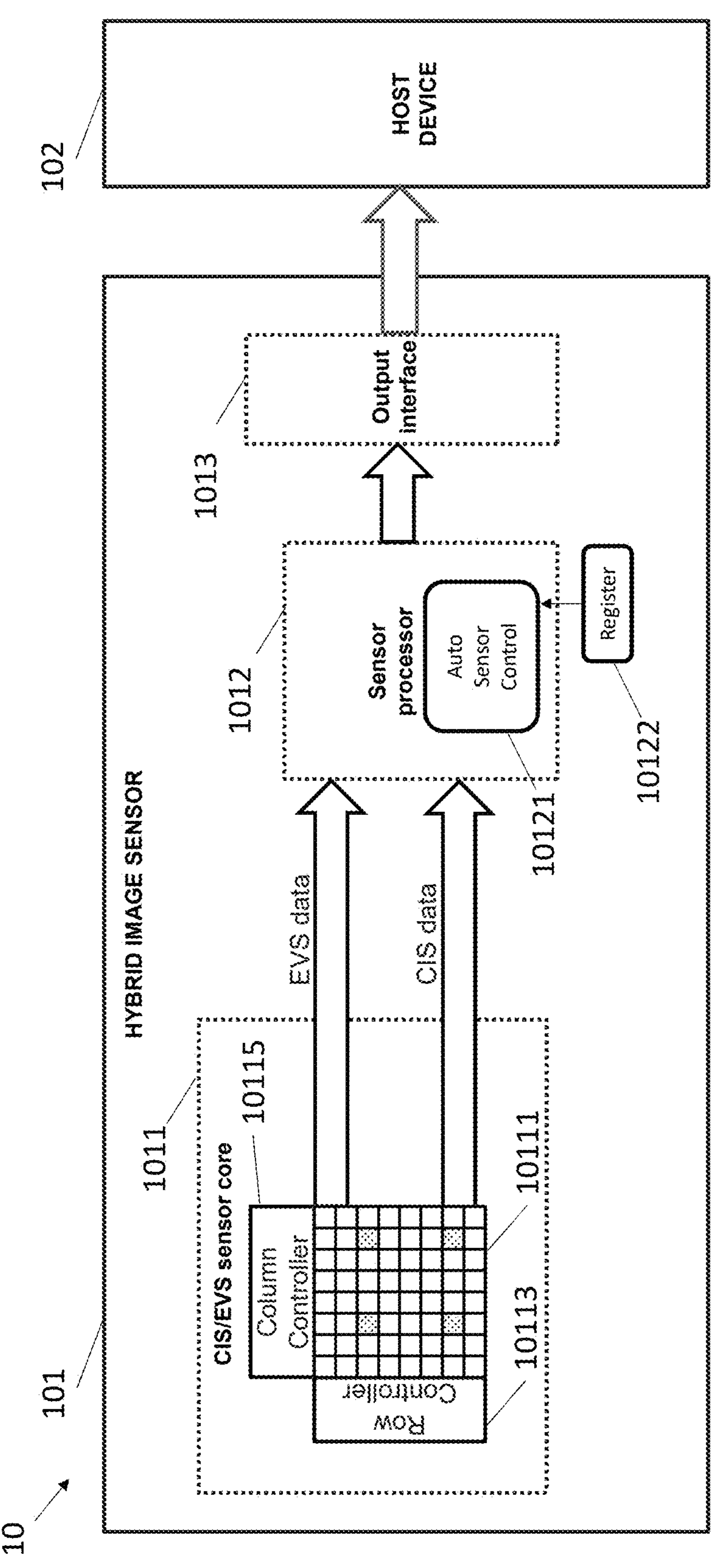
FIG. 10A illustrates a system diagram of an image system, in accordance with some embodiments of the present disclosure.

FIG. 10A illustrates a system diagram of an image system 10, in accordance with some embodiments of the present disclosure.

In some embodiments of the present disclosure, the method in FIG. 9 can be performed by an image system 10 as shown in FIG. 10A. In some embodiments of the present disclosure, the image system 10 includes a hybrid image sensor 101 and a host device 102. In some embodiments of the present disclosure, the hybrid image sensor 101 includes a CIS/EVS sensor core 1011, a sensor processor 1012 and an output interface 1013. In some embodiments of the present disclosure, the CIS/EVS sensor core 1011 includes an image array 10111, a row controller 10113 and a column controller 10115. In some embodiments of the present disclosure, the row controller 10113 and the column controller 10115 control the rows and columns of the pixels in the image array 10111, respectively. In some embodiments of the present disclosure, the EVS data and the CIS data output from the image array 10111 are transmitted to the sensor processor 1012 to perform the method in FIG. 9. In some embodiments of the present disclosure, the processed results can be transmitted to the output interface 1013 so as to be further transmitted to the host device 102.

In some embodiments of the present disclosure, the hybrid image sensor 101 further comprises an automatic sensor control 10121. The functions of the automatic sensor control 10121 is the same as the automatic sensor control 607 in FIGS. 6A and 6B and are also illustrated in FIG. 7. In some embodiments of the present disclosure, the automatic sensor control 10121 is a part of the sensor processor 1012. In some embodiments of the present disclosure, the hybrid image sensor 101 further comprises a register 10122 for storing the metric weights.

In some embodiments of the present disclosure, the image system 10 comprises a hybrid image sensor 101 and control circuitry (i.e., the auto sensor control 10121). The hybrid image sensor 101 comprises an event driven sensing array and a pixel array. The event driven sensing array includes a plurality of event vision sensor (EVS) pixels arranged in EVS pixel rows. Each EVS pixel of the plurality of EVS pixels is configured to capture EVS data corresponding to contrast information of light incident on that EVS pixel. The pixel array includes a plurality of CMOS image sensor (CIS) pixels arranged in CIS pixel rows. Each CIS pixel of the plurality of CIS pixels is configured to capture CIS data corresponding to intensity of light incident on the CIS pixel. The control circuitry is configured to perform operations comprising: generating metrics based on the EVS data and the CIS data, loading metric weights for each metric of the metrics from registers, building a cost function by combining the metric weights with the metrics, and optimizing a sensor setting of the event driven sensing array by repeatedly changing the sensor setting to obtain a specific value of the sensor setting that maximizes or minimizes the cost function.

In some embodiments of the present disclosure, the auto sensor control 10121 and the registers 10122 are integrated with the hybrid image sensor 101 on the same semiconductor chip.

Figure 10B:
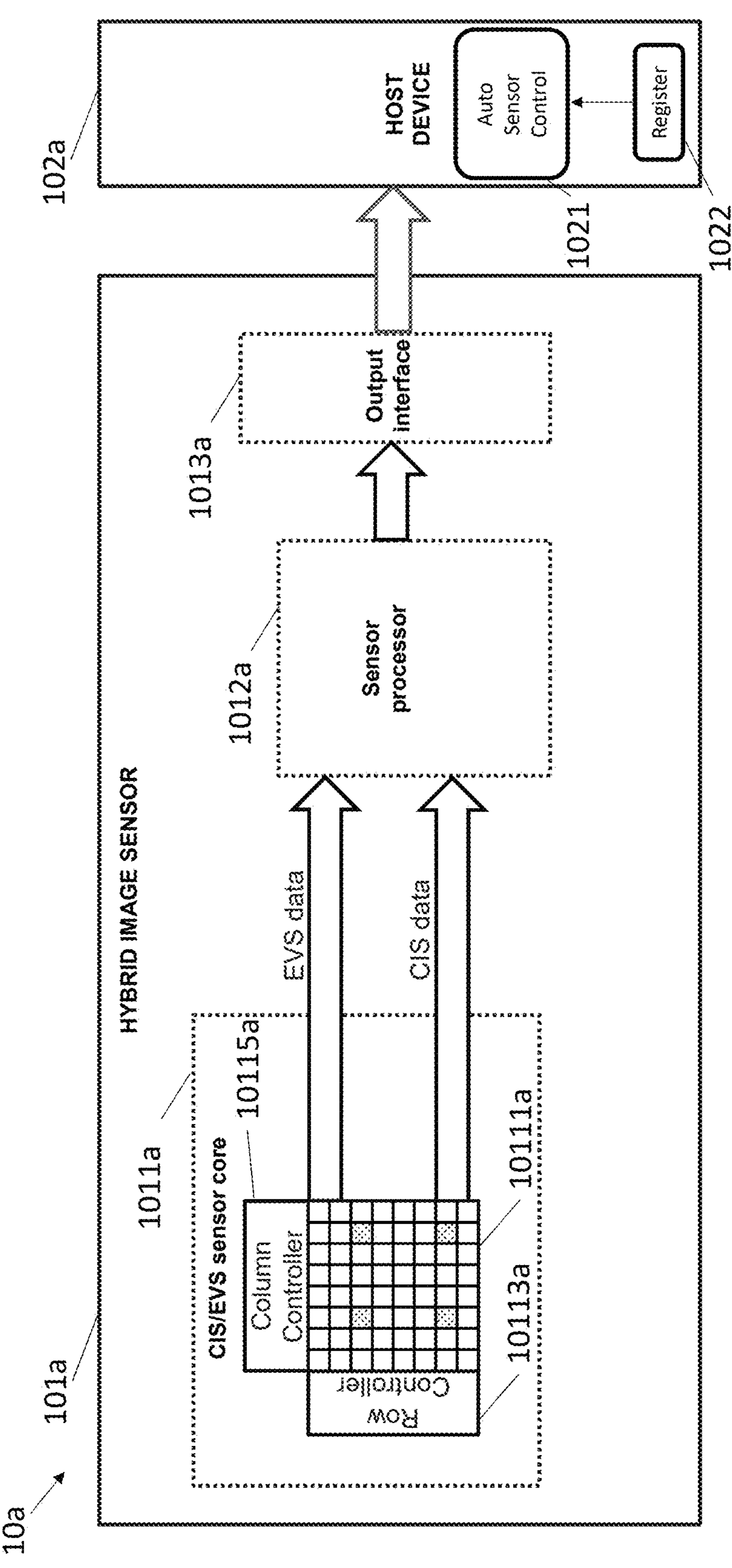
FIG. 10B illustrates a system diagram of an image system, in accordance with some embodiments of the present disclosure.

FIG. 10B illustrates a system diagram of an image system 10*a*, in accordance with some embodiments of the present disclosure.

In some embodiments of the present disclosure, the method in FIG. 9 can be performed by an image system 10*a* as shown in FIG. 10B. In some embodiments of the present disclosure, the image system 10*a* includes a hybrid image sensor 101*a* and a host device 102*a*. In some embodiments of the present disclosure, the hybrid image sensor 101*a* includes a CIS/EVS sensor core 1011*a*, a sensor processor 1012*a* and an output interface 1013*a*. In some embodiments of the present disclosure, the CIS/EVS sensor core 1011*a* includes an image array 10111*a*, a row controller 10113*a* and a column controller 10115*a*. In some embodiments of the present disclosure, the row controller 10113*a* and the column controller 10115*a* control the rows and columns of the pixels in the image array 10111*a*, respectively. In some embodiments of the present disclosure, the EVS data and the CIS data output from the image array 10111*a* are transmitted to the sensor processor 1012*a* to perform the method in FIG. 9. In some embodiments of the present disclosure, the processed results can be transmitted to the output interface 1013*a* so as to be further transmitted to the host device 102*a*.

In some embodiments of the present disclosure, the host device 102*a* further comprises an automatic sensor control 1021. The functions of the automatic sensor control 1021 are the same as the automatic sensor control 607 in FIGS. 6A and 6B and are also illustrated in FIG. 7. In some embodiments of the present disclosure, the host device 102*a* further comprises a register 1022 for storing the metric weights. In some embodiments of the present disclosure, the auto sensor control 10121 and the registers 10122 are integrated in a semiconductor chip different from the hybrid image sensor 101.

Event vision sensors represent a significant advancement in the field of visual perception technology, particularly through the implementation of dynamic and automatic sensor control mechanisms. These sensors operate by continuously monitoring one or more image quality or system performance factors, which are quantified as numerical metrics. These objective metrics serve as critical indicators of image quality, enabling the sensor to adaptively adjust its settings in real-time to optimize performance.

The integration of multiple metrics allows for a comprehensive assessment of the sensor's operational environment, facilitating informed decision-making regarding the necessary adjustments to sensor parameters. For instance, metrics such as contrast threshold, capacitance, and resolution can be analyzed collectively to determine the optimal configuration for the sensor under varying conditions. This multi-metric approach not only enhances the sensor's adaptability but also ensures that it can maintain high levels of performance across diverse scenarios.

A key feature of this system is the feedback loop that continuously updates the sensor settings based on the real-time analysis of the objective metrics. This feedback mechanism is crucial for maintaining the sensor's responsiveness to changes in the environment, thereby ensuring that image quality remains consistently high. By automatically controlling at least one sensor setting, such as contrast threshold or resolution, the system can dynamically respond to fluctuations in lighting conditions, object movement, and other variables that impact image capture.

The automatic control of sensor settings allows for more efficient operation in applications where rapid changes in the environment are common. This capability is particularly beneficial in fields such as robotics, autonomous vehicles, and surveillance systems, where maintaining optimal image quality is essential for accurate perception and decision-making.

In conclusion, the event-based vision sensor with dynamic and automatic sensor control represents a sophisticated approach to image capture and processing. By leveraging objective metrics to guide sensor adjustments, this technology not only enhances image quality but also improves overall system performance. The continuous feedback loop ensures that the sensor remains adaptable and responsive, making it a valuable tool in a wide range of applications that demand high-performance visual sensing capabilities.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An imaging system, comprising:

a hybrid image sensor, comprising:

an event driven sensing array including a plurality of event vision sensor (EVS) pixels arranged in EVS pixel rows, wherein each EVS pixel of the plurality of EVS pixels is configured to capture EVS data corresponding to contrast information of light incident on that EVS pixel, and a pixel array including a plurality of CMOS image sensor (CIS) pixels arranged in CIS pixel rows, wherein each CIS pixel of the plurality of CIS pixels is configured to capture CIS data corresponding to intensity of light incident on the CIS pixel; and control circuitry configured to perform operations comprising:

generating metrics based on the EVS data and the CIS data, loading metric weights for each metric from registers, building a cost function by combining the metric weights with the metrics, and optimizing a sensor setting of the event driven sensing array by repeatedly changing the sensor setting to obtain a specific value of the sensor setting that maximizes or minimizes the cost function.

2. The imaging system according to claim 1, wherein the metrics are measurements used to evaluate image quality or system performance of the imaging system.

3. The imaging system according to claim 1, wherein the metrics include one or more of signal-to-noise ratio (SNR), histogram, gradient, event noise count, local density and object detection confidence score.

4. The imaging system according to claim 1, wherein one of the metrics is proportional to a sharpness value, wherein the sharpness value is a sum of intensity differences of the EVS pixels of the plurality of EVS pixels that sense events.

5. The imaging system according to claim 4, wherein the one of the metrics is inversely proportional to a noise value, wherein the noise value is a standard deviation of the noise of the EVS pixels of the plurality of EVS pixels that do not sense events.

6. The imaging system according to claim 1, wherein the cost function is a linear function of the metrics and the metric weights.

7. The imaging system according to claim 1, wherein the cost function is a quadratic function of the metrics and the metric weights.

8. The imaging system according to claim 1, wherein optimizing the sensor setting comprises maximizing or minimizing the cost function with one of the optimizers in machine learning.

9. The imaging system according to claim 1, wherein the sensor setting is a contrast threshold of the plurality of EVS pixels.

10. The imaging system according to claim 1, wherein the control circuitry and the registers are integrated with the hybrid image sensor on the same semiconductor chip.

11. The imaging system according to claim 1, wherein the control circuitry and the registers are integrated in a semiconductor chip different from the hybrid image sensor.

12. A method of operating an imaging system including a hybrid image sensor, the method comprising:

generating metrics based on event vision sensor (EVS) data captured using a plurality of EVS pixels and CMOS image sensor (CIS) data captured using a plurality of CIS pixels of the hybrid image sensor, loading metric weights for each metric from registers, building a cost function by combining the metric weights with the metrics, and optimizing a sensor setting of the plurality of EVS pixels by repeatedly changing the sensor setting to obtain a specific value of the sensor setting that maximizes or minimizes the cost function.

13. The method according to claim 12, wherein the metrics are measurements used to evaluate image quality or system performance of the imaging system.

14. The method according to claim 12, wherein the metrics include more than one of signal-to-noise ratio (SNR), histogram, gradient, event noise count, local density and object detection confidence score.

15. The method according to claim 12, wherein one of the metrics is proportional to a sharpness value, wherein the sharpness value is a sum of intensity differences of the EVS pixels of the plurality of EVS pixels that sense events.

16. The method according to claim 15, wherein the one of the metrics is inversely proportional to a noise value, wherein the noise value is a standard deviation of the noise of the EVS pixels of the plurality of EVS pixels that do not sense events.

17. The method according to claim 12, wherein the cost function is a linear function of the metrics and the metric weights.

18. The method according to claim 12, wherein the cost function is a quadratic function of the metrics and the metric weights.

19. The method according to claim 12, wherein optimizing the sensor setting comprises maximizing or minimizing the cost function with one of the optimizers in machine learning.

20. The method according to claim 12, wherein the sensor setting is a contrast threshold of the plurality of EVS pixels.

* * * * *